United States Patent [19]

Malmasson

[11] Patent Number: 5,513,228
[45] Date of Patent: Apr. 30, 1996

[54] CLAMP FOR TWO TUBULAR COMPONENTS, HAVING A SAFETY BLOCKING DEVICE, AND USE OF SUCH CLAMP

[75] Inventor: Jacques Malmasson, Evry, France

[73] Assignee: Framatome, Courbevoie, France

[21] Appl. No.: 311,868

[22] Filed: Sep. 26, 1994

[30] Foreign Application Priority Data

Sep. 28, 1993 [FR] France ................................ 93 11519

[51] Int. Cl.$^6$ ........................................ G21C 13/00
[52] U.S. Cl. ........................ 376/203; 24/279; 24/285; 285/81; 285/411; 411/222; 411/234
[58] Field of Search ........................ 376/203, 204, 376/254, 260, 307, 463; 285/81, 82, 91, 366, 367, 409, 410, 411; 24/279, 285; 411/222, 234, 235

[56] References Cited

U.S. PATENT DOCUMENTS

| | | | |
|---|---|---|---|
| 3,797,079 | 3/1974 | Nixon | 24/285 |
| 3,843,168 | 10/1974 | Morrill et al. | 285/411 |
| 4,739,542 | 4/1988 | Krzesicki | 285/411 |
| 4,807,262 | 2/1989 | Shields | 376/203 |
| 4,812,285 | 3/1989 | Stapleton | 376/203 |
| 5,323,428 | 6/1994 | Porter et al. | 376/204 |

FOREIGN PATENT DOCUMENTS

| | | |
|---|---|---|
| 2297377 | 8/1976 | France . |
| 1294117 | 4/1969 | Germany . |

*Primary Examiner*—Daniel D. Wasil
*Attorney, Agent, or Firm*—Pollock, Vande Sande & Priddy

[57] ABSTRACT

The clamping and locking device (18) of the clamp includes a screw (22) arranged in a direction which is transverse with respect to the articulated elements of the clamp and engaged through two blocks (19, 19') bearing on two articulated elements of the clamp, which include two guide journals (20a, 20b) each engaged and held in an opening of a bar (26a, 26b). The openings (27a, 27b; 28a, 28b) include a pair (27a, 27b) of circular openings and a pair (28a, 28b) of oblong openings. Nuts (25, 25') allow the clamp to be clamped and locked. The clamp further includes a blocking device (31) consisting of a support (33) including a strut (34) traversed by an opening and including parts (35a, 35b) for engagement on the bars (26a, 26b), a lock nut (37) rotationally mounted in the opening of the support (33), an arrangement (41) for blocking the lock nut (37) in rotation and in axial translation, and at least one blocking finger (44a, 44b) pivotably mounted on the support (33).

7 Claims, 5 Drawing Sheets

CLAMP FOR TWO TUBULAR COMPONENTS, HAVING A SAFETY BLOCKING DEVICE, AND USE OF SUCH CLAMP

FIELD OF THE INVENTION

The invention relates to a clamp for leaktight connection of two tubular elements, and in particular a clamp for two tubular components, arranged end-to-end, of the support of a thermocouple column of a pressurized water nuclear reactor.

BACKGROUND OF THE INVENTION

Pressurized water nuclear reactors include a vessel in which the core of the nuclear reactor is located and which is closed at its top by a generally domed head. When the nuclear reactor is in service, reactor cooling fluid which consists of water at very high temperature and at very high pressure (310° C. and 155 bar) flows inside the vessel, in contact with the fuel assemblies constituting the core of the reactor.

During operation of the nuclear reactor, it is necessary to measure the various physical parameters inside the core, and in particular the temperature inside certain fuel assemblies. The vessel head is traversed by tubular components termed adapters, which are arranged parallel to the vertical axis of the vessel, plumb with certain positions of fuel assemblies in the core.

On part of the adapters, multiple-part tubular supports are mounted which make it possible to ensure leaktight passage of a thermocouple column used for measuring the temperature in a group of assemblies of the core.

The thermocouple column can be engaged in the bore of the tubular support and clamped in a leaktight manner against a bearing zone, with interposition of a metal seal using a removable clamping device which bears on the upper part of the support.

To allow dismounting of the thermocouple column in any event, the tubular support is made in two parts placed end-to-end and assembled by a clamp consisting of several parts in the form of ring portions assembled by screws, bearing on frustoconical thrust bearing zones situated at the ends of the two parts of the tubular support which are attached to each other, in order to clamp the two parts of the support in the axial direction, with interposition of a seal between their abutting ends.

To facilitate handling and fitting of the clamps, which are heavy components, it has been proposed to produce these clamps in an articulated form, the clamp consisting of elements having an internal surface in the form of ring portions joined together in an articulated fashion, in the manner of a chain, by bars and by pins parallel to the axis of the clamp.

Two of the articulated elements include ends intended to close the clamp, having recesses intended to interact with the bearing components of corresponding shape when tightening the clamp.

A screw passes through the bearing components in a direction perpendicular to the axis of the clamp. Two locking nuts are engaged on the ends of the screw, so as to come into contact with the bearing components in order to tighten the clamp, by pressure on the bearing components which are themselves in contact with the recesses of the articulated elements. The bearing components each include two journals whose axes are aligned and which are introduced and held in through-openings, situated opposite each other, of two bars placed on either side of the articulated elements and of the screw which is engaged in two forked parts of the articulated elements.

One of the pairs of through-openings of the bars consists of circular openings in which the journals of one bearing component are engaged with minimal clearance, and the other pair of openings consists of oblong openings in which the journals of the other bearing component can slide in the longitudinal direction of the bars and of the screw, in order to facilitate fitting of the clamp.

After the clamp has been fitted on the junction parts of the elements of the tubular support of the penetration, the clamp is tightened by screwing one of the nuts so as to bring together the internal annular portions of the articulated elements of the clamp and to exert axial forces on the two tubular parts of the support between which a seal is interposed.

The clamps of the thermocouple column supports are subjected, during operation of the reactor, to large forces, because of the very high pressure of the reactor cooling fluid.

In the event that these forces lead to breakage of the screw for tightening the clamp, the bearing components move away from each other, which produces a degree of opening of the clamp. This relative movement of the bearing components is limited by the fact that the journals of the bearing component which are situated in the oblong openings come into abutment against the outer end of the oblong openings. The clamp remains in place on the abutting bearing parts of the supports of the thermocouple column, but no longer seal the linkage between the two parts of the support, so that an uncontrolled leak of cooling fluid occurs between the two parts of the support.

This may result in difficulties for continuing to ensure the safety of the nuclear reactor.

More generally, in the case of use of a clamp for any two tubular elements placed end-to-end and clamped together, it is highly advantageous to have a means making it possible to control a leak at the junction between the tubular elements, in the event of breakage of the screw for tightening the clamp or for retaining the locking nuts of the clamp to prevent them untightening.

SUMMARY OF THE INVENTION

The object of the invention is therefore to provide a clamp for leaktight connection of two tubular components, including at least two elements having a part in the form of a portion of a ring, which are articulated to each other around a pin parallel to the axis of the ring portions, and having an internal surface for bearing on two bearing surfaces of the tubular components for clamping them in the axial direction with interposition of a seal and a clamping and locking device including a screw arranged in a direction which is transverse with respect to the articulated elements and which is engaged through two bearing blocks, each including a part for bearing on a recess of one of the articulated elements and a guide journal on each side of the bearing part, which are engaged and held in a pair of openings arranged opposite each other and passing through two mutually parallel guide bars, arranged on either side of the junction parts of the articulated elements including the recesses and two nuts engaged on the screw each abutting on one bearing block, the openings of one pair of openings of the guide bars having a circular shape and the other openings having an oblong shape which is elongated along the direction of the screw, this clamp making it possible to control leakage of fluid between the two tubular elements in the event of breakage of the screw and to provide the clamping device with a nut retention device.

For this purpose, the clamp according to the invention furthermore comprises a blocking device consisting of:

a support traversed by an opening and including parts for engagement on the bars, a lock nut rotationally mounted in the opening of the support, having a tapped opening for it to be engaged by screwing on one end of the screw which is situated on the oblong opening side, and a part for bearing on the nut engaged on the end of the screw, means for blocking the lock nut in rotation and in axial translation with respect to the support, and at least one blocking finger including a locking stud and a button mounted so as to pivot on the support about an axis perpendicular to the axis of the screw between a blocking position where the locking stud is engaged in an end part of one oblong opening, and an open position, the lock nut including a bearing part for holding the blocking finger in the blocking position.

BRIEF DESCRIPTION OF THE DRAWINGS

In order that the invention may be more clearly understood, a description will now be given, by way of example, with reference to the attached drawings, of a thermocouple column including a clamp for locking two successive parts of its tubular support and a clamp for locking a thermocouple column support according to the invention.

DETAILED DESCRIPTION

Figure 1:
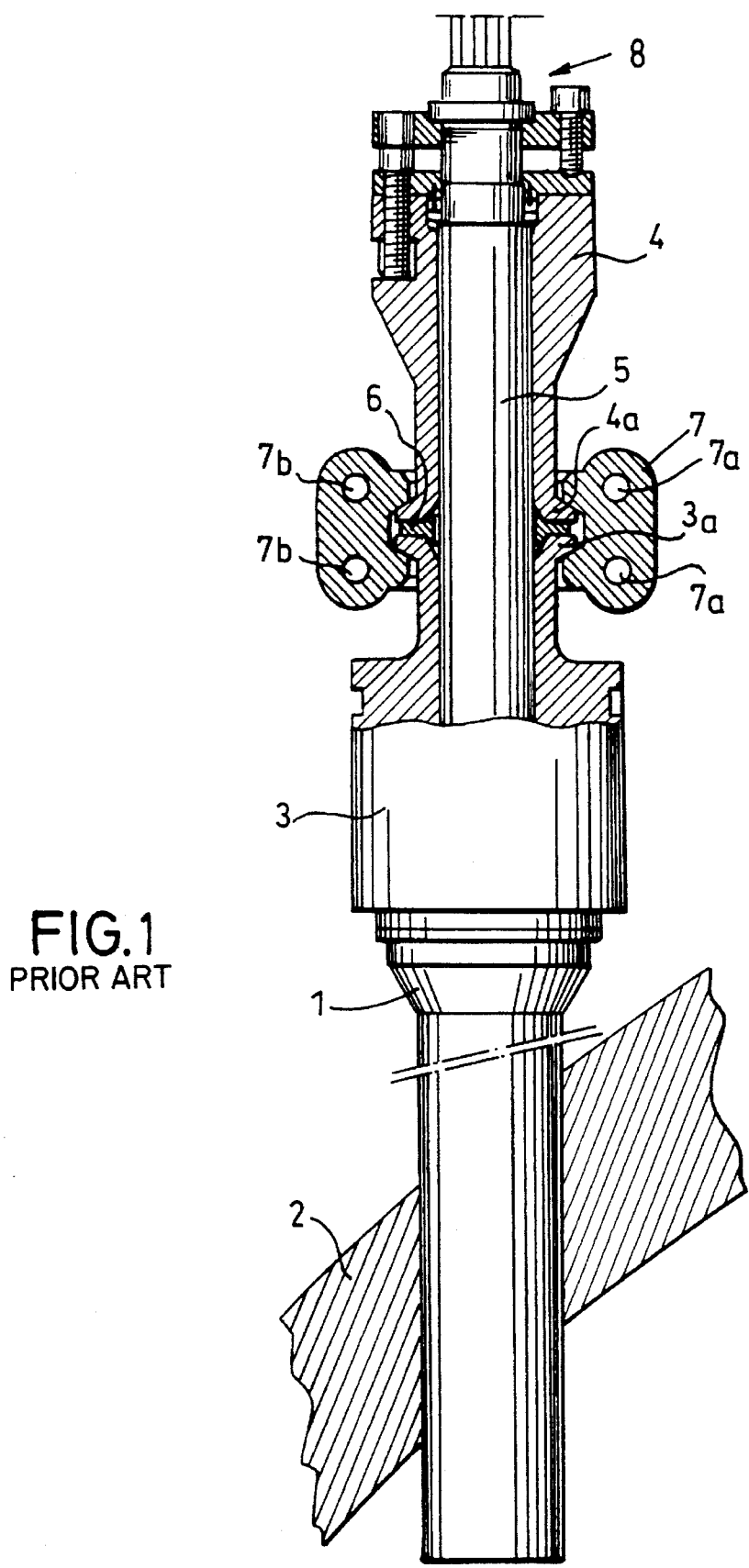
FIG. 1 is a view in section through a vertical plane of symmetry of a thermocouple column including a locking clamp according to the prior art.

FIG. 1 shows a penetration adapter 1 of the head 2 of the vessel of a pressurized water nuclear reactor, onto which is screwed and welded the lower part 3 of a tubular support of a thermocouple column 5 passing through the head of the vessel 2, inside the adapter 1.

The support of the thermocouple column 5 includes an upper part 4 which is connected end-to-end with the lower part 3 fixed onto the adapter 1, with the interposition of a seal 6, by means of a clamp 7.

The thermocouple column 5 is fixed in a leaktight manner inside the upper part 4 of the support, by a lifting and clamping assembly 8 allowing a pressure to be exerted on a seal interposed between a shoulder of the thermocouple column and a shoulder arranged opposite in the bore of the tubular support.

The clamp 7 consists of two parts in the form of ring portions, including lugs traversed by assembly openings such as 7a and 7b.

The lower part 3 and the upper part 4 of the tubular support include, in their end parts which are connected end-to-end, frustoconical shoulders, 3a and 4a respectively, and the clamp 7 includes annular internal surface portions of frustoconical shape intended to bear on the frustoconical surfaces 3a and 4a of the ends of the parts of the support.

In order to assemble the two parts of the support, these are brought together, the seals 6 being interposed between their ends, which are connected end-to-end.

The elements in the form of ring portions constituting the clamp 7 are fitted in the junction region of the two parts of the support, so that their internal surfaces come into contact with the frustoconical surfaces 3a and 4a of the two parts of the support. The assembly lugs of the ring portions are made to coincide and screws engaged in the openings such as 7a and 7b make it possible to assemble and tighten the clamp 7. The clamping of the ring portions which constitute two half-collars of the clamp is effected using threaded rods engaged in the openings such as 7a and 7b and tightened by nuts which bear on the assembly lugs.

Such assembly takes a fairly long time to carry out, and the presence of at least two operators near the upper surface of the vessel head, i.e., near a component which emits radioactive radiation. Because of their mode of production and assembly, the two half-collars constituting the clamp are relatively heavy and their assembly requires the two half-collars to be held in their assembly position before insertion of the rods and screwing of the assembly nuts.

The presence of two operators near the vessel head for an intervention time which may be long and lead to high radiation dose levels for the two operators.

The use of articulated clamps which are more lightweight than clamps assembled by rods and nuts, and which are much faster to fit, allows the clamps to be fitted by a single operator in a shorter time, so that radiation doses received are themselves reduced.

However, as explained above, these clamps whose clamping element consists of a transverse screw do not allow perfect control of leakage of pressurized cooling fluid of the reactor in the event of breakage of the screw.

FIGS. 2 to 6 represent a clamp according to the invention, made in articulated form and including a blocking device making it possible to limit and control the rate of leakage of the cooling fluid of the reactor, in the event of breakage of the clamping screw.

Figure 2:
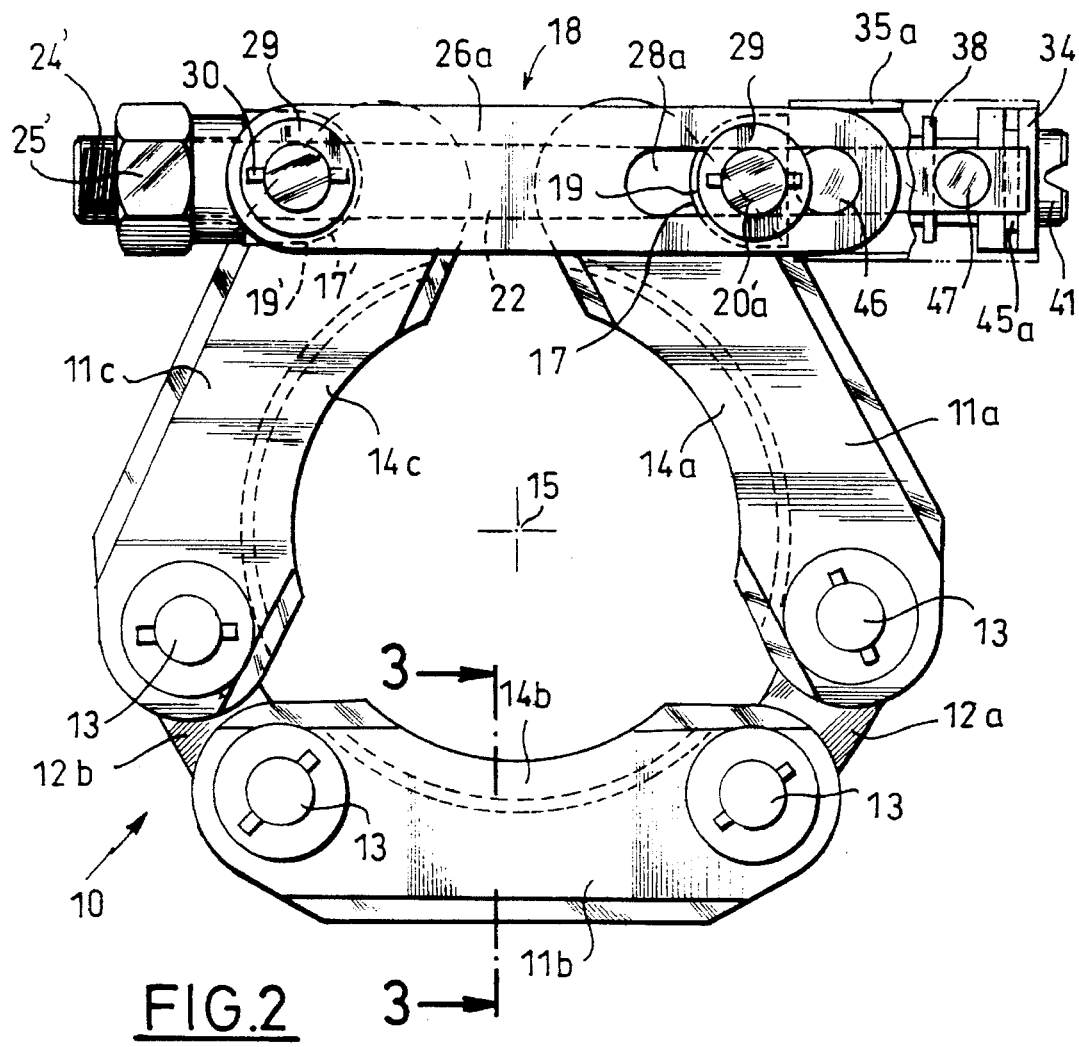
FIG. 2 is a plan view of a locking clamp according to the invention.

As can be seen in FIG. 2, the clamp 10 according to the invention includes three arms 11a, 11b and 11c which are joined together in articulated fashion by means of two bars 12a and 12b and pins 13 which are all parallel to each other and perpendicular to the plane side faces of the arms 11a, 11b and 11c.

The arms 11a, 11b and 11c are machined on their inner faces to constitute three surfaces, 14a, 14b and 14c respectively, in the form of ring portions which all have, in the closed position of the clamp represented in FIG. 2, the same axis 15, which constitutes the axis of the clamp.

The articulation pins 13 are also parallel to the axis 15.

Figure 3:
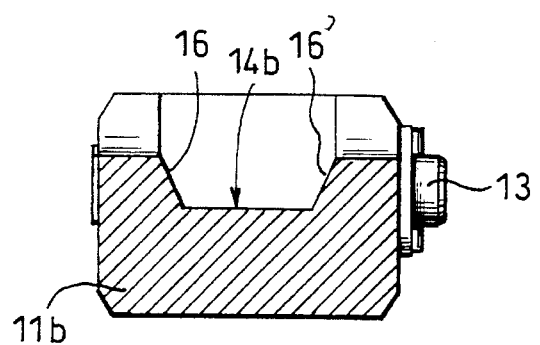
FIG. 3 is a view in section along 3—3 of FIG. 2.

As can be seen in FIG. 3, the inner surfaces in the form of ring portions, such as the surface 14b of the arm 11b, include two side surfaces 16 and 16' inclined with respect to the mid-plane of the surface 14b, and of annular shape, intended to come into contact with the frustoconical annular surfaces such as 3a and 4a (FIG. 1) of two parts, which can be connected end-to-end, of a thermocouple column support.

During closure and locking of the clamp 10, axial clamping of the two support components is produced, with respect to each other, with interposition of a seal, by the interaction of the surfaces 16 and 16' and of surfaces such as 3a and 4a of end parts of the components to be connected.

The clamping and locking of the clamp 10 is effected by a device 18 including two bearing blocks 19 and 19' which come into contact when clamping and locking the clamp 10, with two recesses 17 and 17' in the form of cylinder portions with circular section machined in the parts of the arms 11a and 11c which point outwards.

A description will now be given, with reference to FIGS. 2, 4, 5 and 6, of the device 18 for clamping and locking the clamp 10 according to the invention.

The bearing blocks 19 and 19' each have a central part delimited by a cylindrical surface whose radius is equal to the radius of the recess 17 or 17' of the arm 11a or 11c on which the block 19 or 19' bears, and a plane surface parallel to the axis of the cylindrical surface made by milling to constitute a plane bearing surface for a nut.

Figure 4:
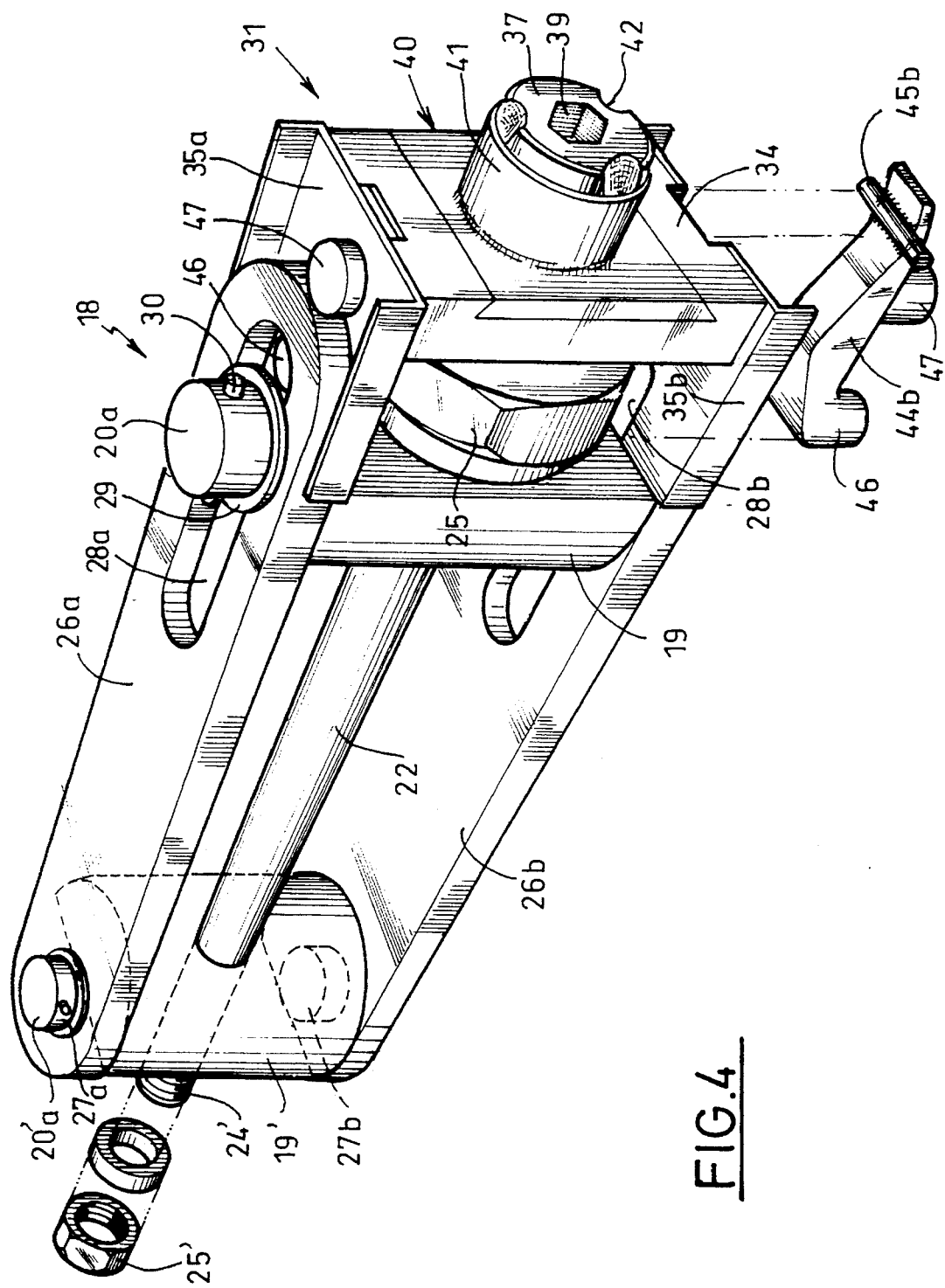
FIG. 4 is a perspective view of the device for clamping and locking the clamp represented in FIG. 2.
Figure 5:
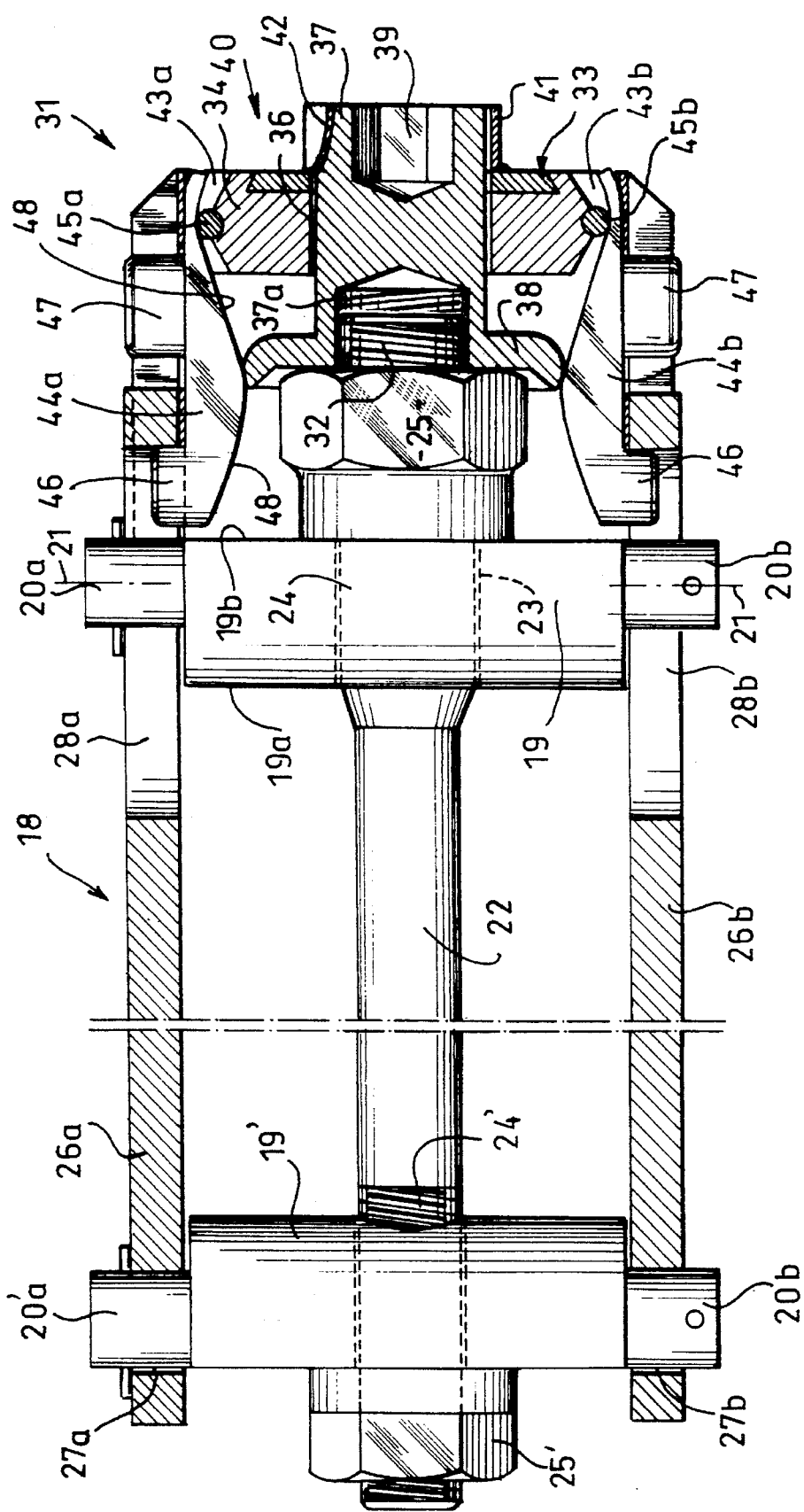
FIG. 5 is a view in partial section of the clamping device represented in FIG. 4, showing the blocking device in its in-use position.
Figure 6:
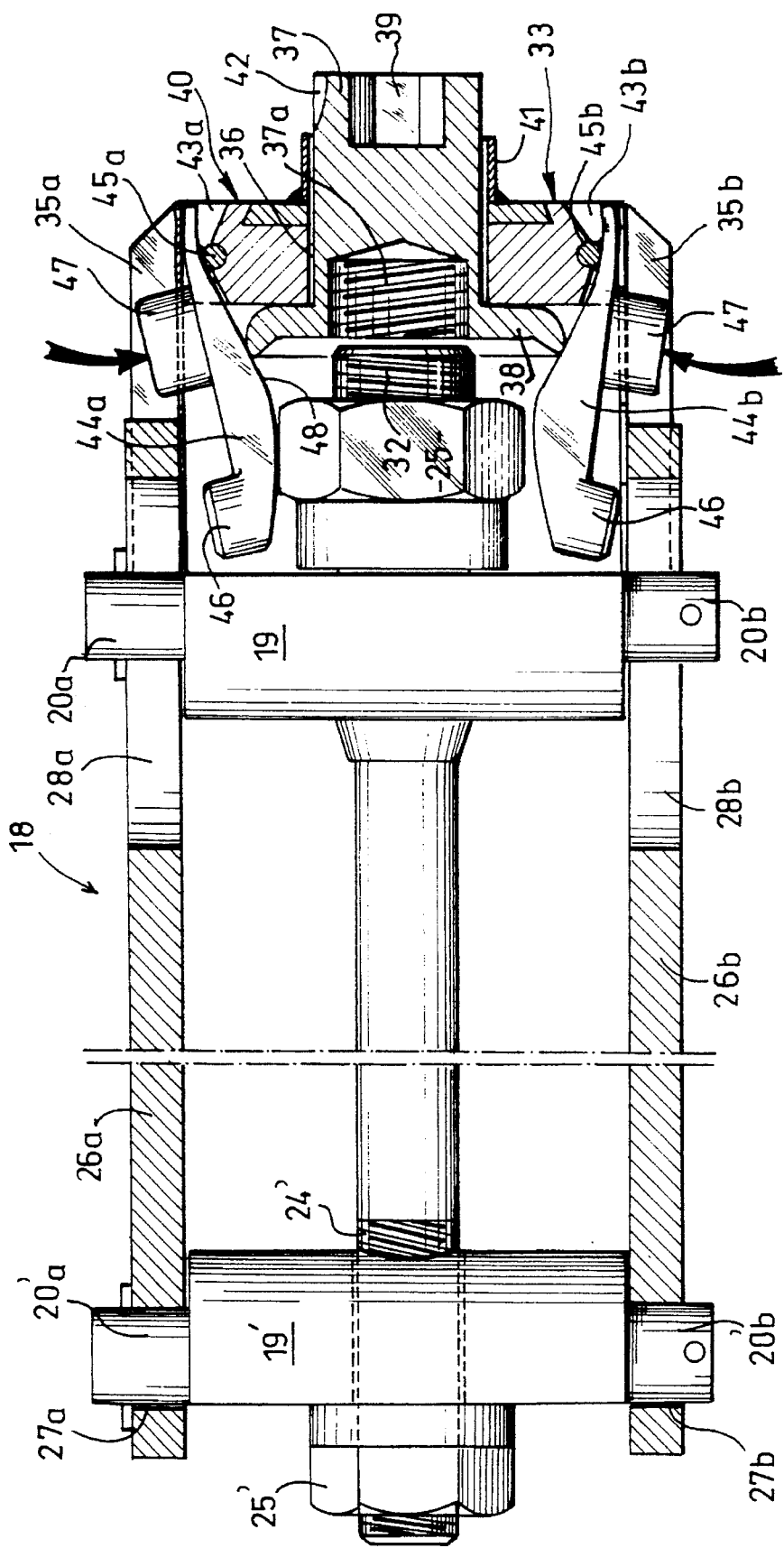
FIG. 6 is a view in partial section, similar to the view in FIG. 5, showing the blocking device in its out-of-use position.

As can be seen in FIGS. 4, 5 and 6, the central part of the block 19 is delimited by the cylindrical surface 19a and the plane surface 19b; the block 19 includes, on either side of the central part, two journals 20a and 20b having a common axis 21 parallel to the axis of the central part.

The block 19' has a shape similar to the shape of the block 19 and is situated in a symmetrical position, so that the cylindrical surfaces of the blocks 19 and 19' bear on the surfaces 17 and 17' of the arms 11a and 11c, which are situated opposite each other.

The central part of each of the components 19 and 19' is traversed by an opening such as 23 (component 19) having a direction perpendicular to the axis 21 of the journals 20a and 20b and to the axis of the central part of the bearing block 19.

A screw 22 is engaged by its threaded end parts 24 and 24' inside openings such as 23, which pass through the blocks 19 and 19', which have a diameter greater than the external diameter of the screw, in order to obtain a slide mounting of the bearing blocks by means of the end parts 24 and 24'. These parts 24 and 24' partially project with respect to each of the blocks 19 and 19', on either side of these blocks.

Nuts 25 and 25', screwed onto the projecting end parts of the screw 22 on either side of the blocks 19 and 19', are placed in contact with the plane surfaces such as 19b of the blocks 19 and 19' to ensure that the cylindrical surfaces such as 19a bear against the recesses 17 and 17' of the arms 11a and 11c of the clamp, and to clamp and lock the clamp 10.

The clamping and locking device 18 includes two bars 26a and 26b, each comprising a circular opening 27a or 27b and an oblong opening 28a or 28b in which the journals of the bearing blocks 19 and 19' are engaged.

The journals of the bearing block 19' are engaged in the circular openings 27a and 27b of the bars 26a and 26b which are placed opposite each other, and the journals 20a and 20b of the block 19 are introduced into the oblong openings, 28a and 28b respectively, which are also situated opposite each other, since the bars 26a and 26b are identical.

The bars 26a and 26b are placed parallel to each other, on either side of the screw 22 and in its axial direction.

The journals such as 20a and 20b and the blocks 19 and 19' are held in the corresponding openings of the bars 26a and 26b by washer assemblies such as 29 and retaining pins such as 30, associated with parts of the journals which project with respect to the external face of the corresponding bars 26a and 26b.

The journals 20a and 20b, whose diameter is less than the diameter of the oblong openings 28a and 28b, are mounted so as to slide in the oblong openings, so that the block 19 can be moved in the longitudinal direction of the oblong openings and of the bars, to make it possible to fit and clamp the clamp by means of the nut 25 bearing against the surface 19b of the bearing block 19. The clamping of the clamp is produced using the bearing block in contact with the recesses 17 and 17' of the articulated arms 11a and 11c of the clamp.

According to the invention, the clamp 10 includes a blocking device 31 which is fitted after the clamp is clamped by means of the nut 25 which is screwed onto the threaded end 24 of the screw 22, so that the screw has an end part 32 which projects outwards with respect to the nut 25 and consists of the end of the threaded part 24.

The blocking device 31 includes a support 33 consisting of a strut 34 whose length is substantially equal to the length of the central part of the bearing block 19 and of two profiled plates 35a and 35b which are fixed to the ends of the strut 34 and include raised edges whose separation is substantially equal to the width of the bars 26a and 26b.

The strut 34 is traversed by a smooth opening 36 in which a lock nut 37 is mounted for rotational and sliding movement.

The lock nut 37 includes a tapped internal bore 37a allowing it to be engaged by screwing onto the threaded projecting end 32 of the screw 22. The tapped bore 37a is open at one of the ends of the lock nut 37, following which the lock nut 37 has a bearing flange 38 on the outside.

At its end opposite the bearing flange 38, the nut 37 includes a profiled opening 39, for example with hexagonal cross-section, making it possible to turn the lock nut 37 inside the smooth opening 36 which is screwed onto the end 32 of the screw 22, using a suitable tool. A blocking component 40, intended to block and trap the lock nut 37, includes a square base having inclined edges which are engaged against the inclined edges of an opening in the strut 34, so as to provide a dovetail assembly between the square base of the blocking component 40 and the strut 34. On the base of the blocking component 40, a thin deformable ferrule 41 is fixed, the internal diameter of which is slightly greater than the external diameter of the lock nut 37.

The lock nut 37 includes recesses 42 in which the deformable ferrule 41 can be engaged and crimped after the lock nut is screwed onto the end 32 of the screw 22, inside the blocking component 40 which includes an opening allowing passage for the lock nut 37, in the extension of the ferrule 41.

The strut 34 has, at its ends fixed onto the plates 35a and 35b, two slots 43a and 43b, in each of which an end part of a blocking finger 44a or 44b is engaged, which finger is mounted so as to pivot on the strut 34 by means of a pin 45a or 45b perpendicular to the axis of the screw 22 which constitutes the axis of the clamp.

The slots 43a and 43b and the end part of the blocking fingers 44a and 44b are produced so as to allow the fingers 44a and 44b to pivot between a blocking position represented in FIG. 5, and an open position, represented in FIG. 6.

Each of the fingers 44a and 44b includes a blocking stud 46 and a push button 47 on one of its substantially plane faces.

The opposite face of the blocking finger includes an inclined surface 48 intended to come into contact with the end of the flange 38 of the lock nut 37, which holds the finger in the blocking position when the lock nut 37 is screwed onto the end 32 of the screw in order to block it, as represented in FIG. 5.

When the lock nut 37 is not engaged with the end part 32 of the screw, the flange 38 bears against the inner surface of the strut 34 and frees the blocking fingers which can be tilted inwards by pushing on the buttons 47, as shown in FIG. 6.

The plates 35a and 35b are traversed by openings allowing passage for the buttons 47 and the blocking studs 46.

After the clamp is fitted and clamped by torquing the nut 25 onto the end of the screw 22, in order to produce the leaktight connection of two tubular components such as two parts of a thermocouple column support, the plates 35a and 35b of the device 31, whose blocking fingers 44a and 44b are placed in the open position by pressing on the buttons 47, the lock nut 37 being in its position bearing against the strut 34 by its flange 38, are engaged on the end parts of the bars 26a and 26b on the oblong openings 28a and 28b side.

The blocking means 40 placed in the opening of the strut 34 is engaged on the projecting external surface of the lock nut. The blocking device 31, whose plates 35a and 35b are engaged on the end parts of the bars 26a and 26b, is held in place, and the lock nut 37 is screwed onto the end 32 of the screw 22 which projects out of the nut 25, by using a profiled key introduced into the opening 39.

The lock nut 37 is screwed until the flange 38 bears against the nut 25.

During the screwing of the lock nut, the external edge of the flange 38 interacts with the actuation surface 48 of each of the blocking fingers, in order to pivot the fingers outwards so that the blocking stud 46 is introduced into the corresponding oblong opening 28a or 28b, at the end of screwing, when the flange 38 abuts against the nut 25.

The blocking studs 46 abut against the outer end of the corresponding oblong opening 28a or 28b, between this end and the journal 20a or 20b.

In fact, the oblong openings 28a and 28b are designed so that, in the clamping and locking position of the clamp, a space of length greater than the diameter of the blocking stud 46 remains between the journals 20a and 20b and the outer end of the oblong openings 28a and 28b.

The lock nut 37 is made irremovable and captive by the crimping of the parts of the deformable ferrule 41 into the recesses 42 of the lock nut 37.

After a repair or maintenance operation on the nuclear reactor, requiring dismounting of the support of one or more thermocouple columns, the support or supports are assembled and clamped in a leaktight manner by using one or more clamps according to the invention.

After restarting of the nuclear reactor, the clamps undergo stresses under the effect of the high-pressure cooling fluid of the reactor.

The locking nuts 25 of the clamps are made irremovable by the fact that the lock nut 37 bears via a flange 38 on the locking nut 25 and constitutes a nut retention device.

In the event of breakage of a screw 22 of a clamp according to the invention including a blocking device 31, the forces tending to open the clamp and separate the branches 11a and 11c and the bearing components 19 and 19' are taken up by the nut 25, the lock nut 37 bearing on the nut, the strut 34, the blocking fingers 44a and 44b and the bars 26a and 26b. The forces are looped round by means of the bearing block 19' engaged by its end journals in the circular openings of the bars 26a and 26b.

Only very slight movement of the branches of the clamp can thus occur, so that the loss in leaktightness of the junction between the tubular elements is itself very small.

The leakage of reactor cooling fluid under very high pressure is therefore greatly limited, which makes it possible to carry out the emergency shutdown of the nuclear reactor in complete safety, without substantial escape of radioactive material.

After shutdown and cooling of the nuclear reactor, it is possible both to remove the defective clamp and to fit a new clamp for the tubular components very quickly.

In order to carry out scheduled or unscheduled repair or maintenance operations, it is possible to remove the clamps easily and quickly, after removal of the blocking device.

In order to remove the blocking device, the fastening ferrule 41 is first cut and separated from the lock nut 37, then the lock nut is unscrewed so as to separate it from the end part 32 of the screw.

The blocking device 31 can then be separated in its entirety from the clamp by exerting pressure on the buttons 47, as represented in FIG. 6. The blocking studs 46 are thus released from the oblong openings 28a and 28b, and the blocking device 31 can be separated from the clamp by a simple pulling action.

The device according to the invention therefore makes it possible to ensure complete safety of the clamps of tubular components subjected to very high stresses. Furthermore, this blocking device can be fitted or removed easily; it can be easily fitted to existing clamps.

The support of the blocking device, the lock nut and the fingers may be produced in a form or manner different from those which have been described.

It is possible to make the lock nut irremovable and captive in a manner different from that which has been described.

Similarly, the actuation of the blocking fingers may be produced by means different from those which have been described.

The invention applies not only to the case of leaktight joining of tubular supports of thermocouple columns, but also to the case of leaktight end-to-end joining of any tubular components which undergo high stresses in use.

I claim:

1. Clamp for leaktight connection of two tubular components, including at least two elements having a part in the form of a portion of a ring, which are articulated to each other around a pin parallel to the axis of the ring portions, and having an internal surface for bearing on two bearing surfaces of the tubular elements for clamping them in the axial direction with the interposition of a seal and a clamping and locking device including a screw arranged transversely to the articulated elements and engaged through two bearing blocks, each of said bearing blocks including a part for bearing on a recess of one of the articulated elements and a guide journal on each side of the bearing part, which are engaged and held in a pair of openings arranged opposite each other and passing through two mutually parallel guide bars, arranged on either side of the junction parts of the articulated elements including the recesses and two nuts engaged on the screw each abutting on one bearing block, the openings of one pair of openings of the guide bars having a circular shape and the other openings having an oblong shape which is elongated along the direction of the screw, said clamp further comprising a blocking device consisting of:

(a) a support traversed by an opening and including parts for engagement on the bars;

(b) a lock nut rotationally mounted in the opening of the support, said lock nut having a tapped opening for screwing on one end of the screw which is situated on the oblong opening side, and a part for bearing on the nut engaged on said one end of the screw;

(c) means for blocking the lock nut against rotation and axial translation with respect to the support; and (d) at least one blocking finger including a locking stud and a button mounted so as to pivot on the support about an axis perpendicular to the axis of the screw between a blocking position in which the locking stud is engaged in an end part of one oblong opening, and an open position, the lock nut including a bearing part for holding the blocking finger in the blocking position.

2. Clamp according to claim 1, wherein the support includes a strut and two profiled plates having raised edges, the plates being fixed parallel to each other on end parts of the strut and having raised edges with a separation substantially equal to the width of the bars and constituting the engagement parts of the support, the strut being traversed by the opening for engagement of the lock nut.

3. Clamp according to claim 2, wherein the strut includes, adjacent its ends fixed to the plates, recesses in which two pivoting blocking fingers are pivotably mounted via pins.

4. Clamp according to claim 1, wherein the lock nut includes a flange which, in the blocking position, bears on the nut engaged on the end of the screw and comprising a surface for actuation of the blocking finger for setting it and holding it in the blocking position.

5. Clamp according to claim 1, wherein the means for blocking the lock nut in rotation and in axial translation with respect to the support include a deformable ferrule connected to the support, and recesses in an end part of the lock nut, which are intended to receive parts of the ferrule which are deformed by crimping.

6. Clamp according to claim 5, wherein the ferrule is integral with a base engaged and held on the support by a dovetail assembly.

7. Clamp according to any one of claims 1 to 6, wherein said components are parts of a tubular support of a thermocouple column of a pressurized water nuclear reactor.

* * * * *